US012646792B2

(12) United States Patent
Kim et al.

(10) Patent No.: US 12,646,792 B2
(45) Date of Patent: Jun. 2, 2026

(54) SECONDARY BATTERY AND CASE, AND METHOD FOR MANUFACTURING SAME

(71) Applicant: LG Energy Solution, Ltd., Seoul (KR)

(72) Inventors: Byeong Kyu Kim, Daejeon (KR); Jung Jin Kim, Daejeon (KR); Tae Hyun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 844 days.

(21) Appl. No.: 17/640,575

(22) PCT Filed: Oct. 7, 2020

(86) PCT No.: PCT/KR2020/013635
§ 371 (c)(1),
(2) Date: Mar. 4, 2022

(87) PCT Pub. No.: WO2021/071232
PCT Pub. Date: Apr. 15, 2021

(65) Prior Publication Data
US 2022/0320674 A1 Oct. 6, 2022

(30) Foreign Application Priority Data
Oct. 8, 2019 (KR) ........................ 10-2019-0124914

(51) Int. Cl.
*H01M 50/342* (2021.01)
*H01M 50/107* (2021.01)

(52) U.S. Cl.
CPC ..... *H01M 50/3425* (2021.01); *H01M 50/107* (2021.01); *H01M 2200/20* (2013.01)

(58) Field of Classification Search
None
See application file for complete search history.

(56) References Cited

U.S. PATENT DOCUMENTS

| | | |
|---|---|---|
| 2003/0077505 A1 | 4/2003 | Goda et al. |
| 2005/0069759 A1 | 3/2005 | Shimamura et al. |
| 2007/0243462 A1 | 10/2007 | Nagatani et al. |
| 2009/0269654 A1 | 10/2009 | Kairawicz et al. |

(Continued)

FOREIGN PATENT DOCUMENTS

| | | |
|---|---|---|
| CN | 108565492 A | 9/2018 |
| CN | 109314202 A | 2/2019 |

(Continued)

OTHER PUBLICATIONS

Extended European Search Report including Written Opinion for Application No. 20873713.0 dated Feb. 13, 2023, pp. 1-10.

(Continued)

*Primary Examiner* — Mary Grace Byram
(74) *Attorney, Agent, or Firm* — Lerner David LLP

(57) ABSTRACT

Disclosed herein are a case for secondary battery, a secondary battery including the case, and a method for manufacturing the case for the secondary battery. According to the present disclosure, a gas discharge device can be formed in the case for a secondary battery. The case may include a recess part with a cutoff area. The gas discharge device can include a passage through which a gas is discharged through the cutoff area of the recess part when a pressure of the empty space in the body part exceeds a predetermined value.

6 Claims, 6 Drawing Sheets

(56)　　　　References Cited

U.S. PATENT DOCUMENTS

| | | | |
|---|---|---|---|
| 2014/0199581 A1 * | 7/2014 | Ryu | H01M 50/557 |
| | | | 429/161 |
| 2014/0295220 A1 | 10/2014 | Mori et al. | |
| 2018/0219199 A1 | 8/2018 | Lee et al. | |
| 2019/0260069 A1 | 8/2019 | Shin et al. | |
| 2020/0358044 A1 | 11/2020 | Jang | |
| 2021/0074978 A1 | 3/2021 | Chun | |

FOREIGN PATENT DOCUMENTS

| | | | |
|---|---|---|---|
| JP | H0559745 | U | 8/1993 |
| JP | 2000182587 | A | 6/2000 |
| JP | 2001307707 | A | 11/2001 |
| JP | 2005129487 | A | 5/2005 |
| JP | 2009146812 | A | 7/2009 |
| JP | 2011520222 | A | 7/2011 |
| JP | 2011165585 | A | 8/2011 |
| JP | 5423825 | B2 | 2/2014 |
| JP | 2014192052 | A | 10/2014 |
| JP | 2018049680 | A | 3/2018 |
| KR | 20010038812 | A | 5/2001 |
| KR | 100683042 | B1 | 2/2007 |
| KR | 20110106505 | A | 9/2011 |
| KR | 101093457 | B1 | 12/2011 |
| KR | 20160047347 | A | 5/2016 |
| KR | 20180043996 | A | 5/2018 |
| KR | 101940524 | B1 | 1/2019 |
| KR | 20190054735 | A | 5/2019 |
| KR | 102023717 | B1 | 9/2019 |
| WO | 2019151662 | A1 | 8/2019 |

OTHER PUBLICATIONS

International Search Report for Application No. PCT/KR2020/013635 mailed Jan. 15, 2021, 2 pages.
Search Report dated Jul. 11, 2023 from the Office Action for Chinese Application No. 202080062217.9 issued Jul. 15, 2023, pp. 1-3.

* cited by examiner 100,100a 110,112

SECONDARY BATTERY AND CASE, AND METHOD FOR MANUFACTURING SAME

CROSS-REFERENCE TO RELATED APPLICATION

The present application is a national phase entry under 35 U.S.C. § 371 of International Application No. PCT/KR2020/013635 filed on Oct. 7, 2020, which claims the benefit of the priority of Korean Patent Application No. 10-2019-0124914, filed on Oct. 8, 2019, the disclosures of which are hereby incorporated by reference in their entirety.

TECHNICAL FIELD

The present invention relates to a case for a secondary battery, a secondary battery including the case for the secondary battery, and a method for manufacturing the case for the secondary battery, and more particularly, to a case for a secondary battery, which has a structure capable of discharging a gas within the secondary battery when an internal pressure of the secondary battery increases, a secondary battery including the case for the secondary battery, and a method for manufacturing the case for the secondary battery.

BACKGROUND ART

Secondary batteries that are repetitively chargeable and dischargeable may be classified into cylindrical type secondary batteries, pouch type secondary batteries, prismatic type secondary batteries, and the like according to their structures and manufacturing methods. Among them, in general, the cylindrical type secondary battery has a structure in which an electrode assembly is accommodated in a cylindrical battery can, and an upper portion of the battery can is sealed by a top cap.

Such a secondary battery may have a problem of generating a gas inside due to abnormal reasons during use or charging. The gas are usually generated with an increase in temperature due to an abnormal operation of the secondary battery. If too much gas is generated, the secondary battery may be exploded, and if the temperature rises too much, the secondary battery may be ignited.

Particularly, in the case of the cylindrical secondary battery, safety devices such as a CID filter and a safety vent are provided according to the related art. Nevertheless, there is a problem in that safety is not completely guaranteed when the gas is generated, or the temperature rises inside the secondary battery.

DISCLOSURE OF THE INVENTION

Technical Problem

Accordingly, an object of the present invention for solving the above problems is to improve safety of the secondary battery by quickly discharging a gas within the secondary battery when a pressure increases due to a generation of the gas in the secondary battery.

Technical Solution

According to a first aspect of the present invention for achieving the above object, provided is a case for secondary battery, the case including: a body part which forms a body of the case and in which an empty space is formed; and a gas discharge device which is formed in the body part and forms a passage through which a gas existing in the empty space in the body part is discharged to the outside when a pressure of the empty space in the body part exceeds a predetermined value, wherein the gas discharge device comprises a recess part that is recessed toward the empty space in the body part, a cutoff area is formed in the recess part, and when the pressure of the empty space in the body part exceeds the predetermined value, the passage is formed through the cutoff area of the recess part.

The recess part may include a first recess area and a second recess area, wherein the first recess area and the second recess area may face each other by using the cutoff area of the recess part as a boundary.

The case may further include a first adhesion part formed by allowing at least a portion of the first recess area and at least a portion of the second recess area to adhere to each other, wherein, when the pressure of the empty space in the body part exceeds the predetermined value, the adhesion of the adhesion part may be released to form the passage.

The first adhesion part may be spaced from an inner surface of the body part.

The recess part may be formed in a bottom surface of the body part.

The recess part may be formed to have a closed curve shape along a circumference of the bottom surface of the body part.

The cutoff area formed in the recess part may be provided in plurality.

The recess part may further include a third recess area and a fourth recess area, wherein the third recess area and the fourth recess area may face each other by using one of the plurality of cutoff areas of the recess part as a boundary, and the case may further include a second adhesion part formed by allowing at least a portion of the third recess area and at least a portion of the fourth recess area to adhere to each other.

According to a second aspect of the present invention for achieving the above object, provided is a secondary battery including: an electrode assembly having a structure in which electrodes and separators are alternately disposed; and the case for secondary battery, which accommodates the electrode assembly.

According to a third aspect of the present invention for achieving the above object, provided is a method for manufacturing a case for secondary battery, the method including: a preparation step of preparing a case including a body part having an empty space formed therein; a cutoff area formation step of cutting at least a portion of a surface of the body part to form a cutoff area in the body part; a recession step of recessing a cutoff area formed in the cutoff area formation step toward the empty space in the body part; and an adhesion step of allowing at least some of areas recessed in the recession step to adhere to each other.

In the cutoff area formation step, two areas of the surface of the body part, which are spaced apart from each other, may be cut to form two cutoff areas in the body part.

Advantageous Effects

According to the present invention, when the gas is generated in the secondary battery, and thus the pressure increases, the gas inside the secondary battery may be quickly discharged to improve the safety of the secondary battery.

MODE FOR CARRYING OUT THE INVENTION

Hereinafter, a structure of a case for a secondary battery according to the present invention will be described with reference to the accompanying drawings.

Case for Secondary Battery

Figure 1:
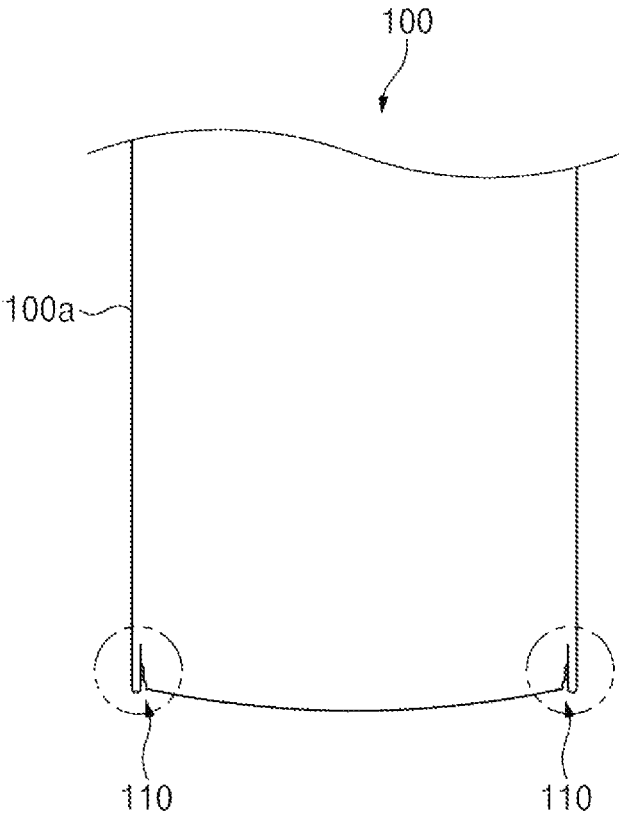
FIG. 1 is a vertical cross-sectional view illustrating a case for a secondary battery according to an embodiment of the present invention.
Figure 2:
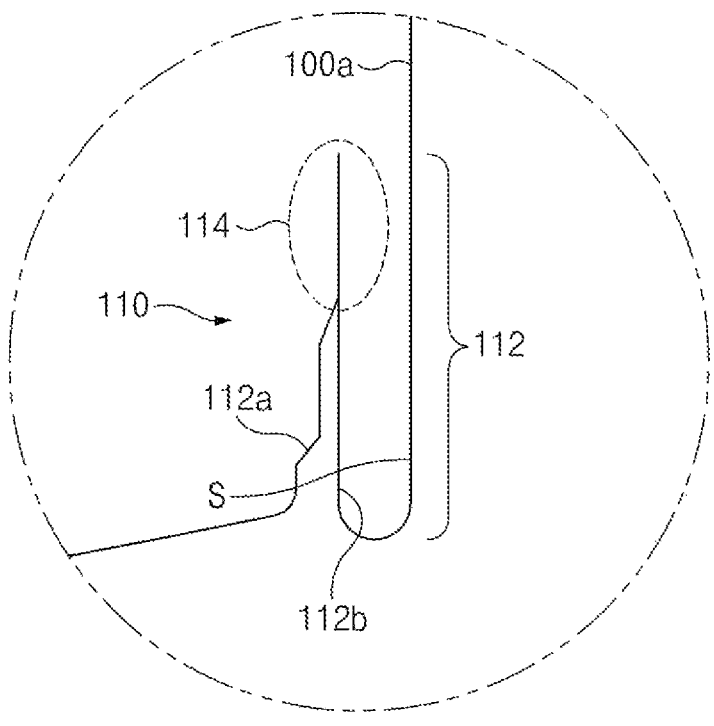
FIG. 2 is an enlarged view of a gas discharge device of the case of FIG. 1.

FIG. 1 is a vertical cross-sectional view illustrating an ordinary structure of a case for secondary battery according to an embodiment of the present invention, and FIG. 2 is a vertical cross-sectional view illustrating an ordinary structure of a gas discharge device provided in the case for secondary battery according to an embodiment of the present invention.

A case for secondary battery according to the present invention may be a case used for a cylindrical type secondary battery. Accordingly, the case for secondary battery according to the present invention may have a cylindrical shape with an upper side opened. However, the case for secondary battery according to the present invention may be applied even when the case has a shape other than the cylindrical shape. Hereinafter, for convenience, the 'case for secondary battery' will be referred to as a 'case'.

As illustrated in FIG. 1, the case 100 according to the present invention may include a body part 100a forming a body of the case and also forming an empty space therein.

Also, the case 100 according to the present invention may further include a gas discharge device 110 formed in the body part 100a. When a pressure of the empty space in the body part 100a of the case 100 exceeds a predetermined value, the gas discharge device 110 may form a passage for discharging a gas existing in the empty space in the body part 100a to the outside.

According to the present invention, the gas discharge device 110 may be integrally formed with the body part 100a of the case 100. The fact that the gas discharge device is formed integrally with the body part may mean that the gas discharge device is made of the same material as the body part, and also, the body part and the gas discharge device are inextricably coupled to each other so that it is difficult to separate the gas discharge device from the body part without damage of the body part itself.

As illustrated in FIG. 1, the gas discharge device 110 may be formed in a bottom surface of the body part 100a.

Referring to FIG. 2, a region recessed toward the empty space inside the body part 100a may be formed in the gas discharge device 110. That is, the gas discharge device 110 may include a recess part 112 that is recessed toward the empty space in the body part 100a.

Referring to FIG. 2, the recess part 112 may include a first recess area 112a and a second recess area 112b. Also, a cutoff area having a cut shape may be formed in the recess part 112, and a first recess area 112a and a second recess area 112b may face each other by using the cutoff area of the recess part 112 as a boundary. That is, according to the present invention, the cutoff area may be formed in the area in which the first recess area 112a and the second recess area 112b, each of which has a shape recessed toward the empty space in the body part 100a, are in contact with each other. As described above, since the gas discharge device 110 may be formed in the bottom surface of the body part 100a. Thus, the recess part 112 may also be formed in the bottom surface of the body part 100a.

According to the present invention, at least some of the recess part 112 may adhere to each other by using the cutoff area formed in the recess part 112 as a boundary. Referring to FIG. 2, at least a portion of the first recess area 112a and at least a portion of the second recess area 112b may adhere to each other to form an adhesion part 114. As illustrated in FIG. 2, one end of the first recess area 112a, which is adjacent to the empty space in the body part 110a, and one end of the second recess area 112b, which is adjacent to the empty space in the body part 100a, may adhere to each other to form the adhesion part 114.

As described above, the recess part 112 may be formed in the bottom surface of the body part 100a. Here, as illustrated in FIG. 2, the adhesion part 114 may be spaced apart from an inner surface S of the body part 100a.

Figure 3:
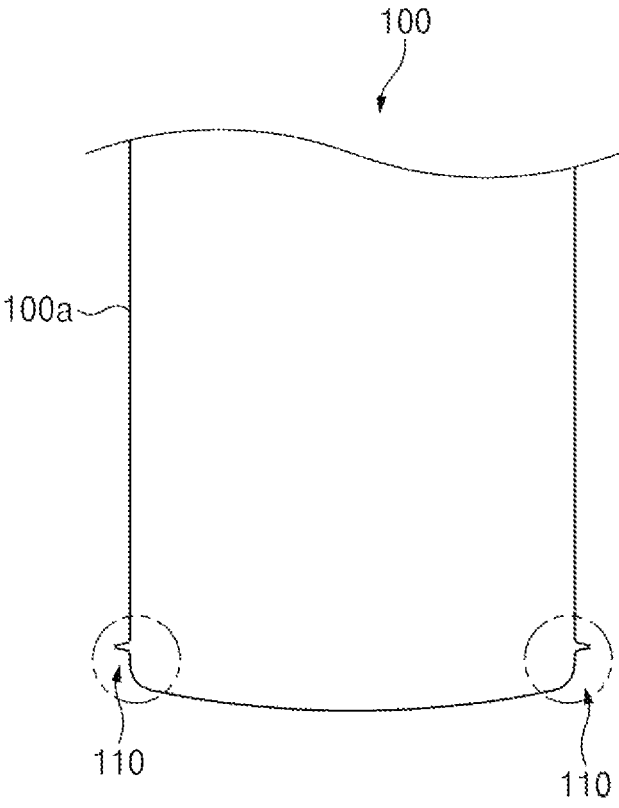
FIG. 3 is a vertical enlarged cross-sectional view illustrating a case for a secondary battery according to another embodiment of the present invention.
Figure 4:
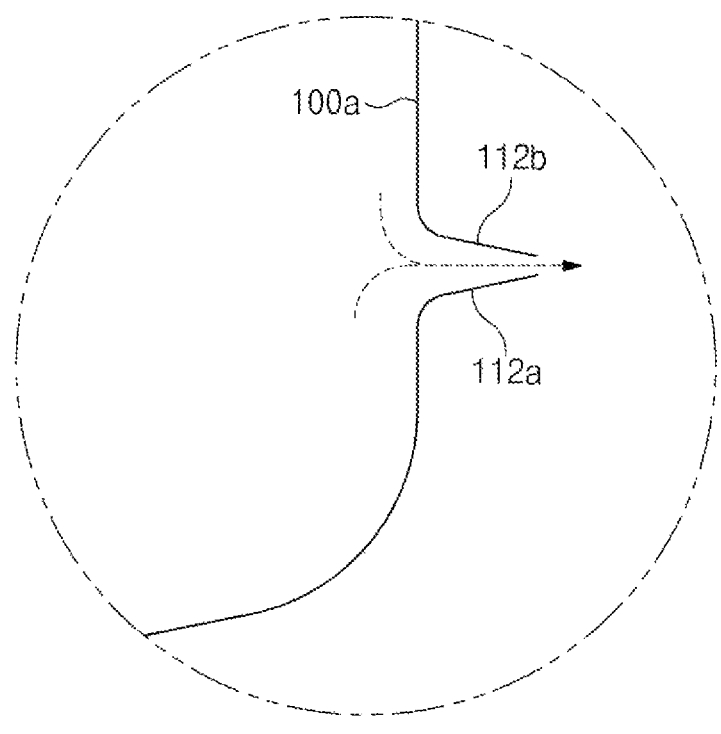
FIG. 4 is a vertical enlarged cross-sectional view of a gas discharge device of the case of FIG. 3.

FIG. 3 is a vertical cross-sectional view illustrating a structure of the case for secondary battery when the gas is discharged through the gas discharge device in the case for secondary battery according to an embodiment of the present invention, and FIG. 4 is a vertical enlarged cross-sectional view illustrating a structure of the gas discharge device when the gas is discharged through the gas discharge device in the case for secondary battery according to an embodiment of the present invention.

Referring to FIGS. 1 to 2, the cutoff area is formed in the gas discharge device 110, but the adhesion part 114 is formed in the cutoff area, the gas discharge device 110 is usually closed.

However, when the pressure of the empty space in the body part 100a of the case 100 exceeds a predetermined value, the adhesion of the adhesion part 114 formed on the gas discharge device 110 may be released to form the passage through which the gas existing in the empty space of the case 100 is discharged through the cutoff area formed in the recess part 112.

That is, referring to FIGS. 3 and 4, when the pressure of the empty space in the body part 100a of the case 100 exceeds a predetermined value, the adhesion of the adhesion part 114 formed in the gas discharge device 110 may be released. As a result, the first recess area 112a and the second recess area 112b may be spaced apart from each other, and one end of each of the first recess area 112a and the second recess area 112b, which is adjacent to the empty space in the body part 110a, may move to the outside of the case 100. Thus, the gas inside the case 100 may be discharged to the outside through a passage formed by the release of the adhesion part 114.

Also, according to the present invention, since one end of each of the first recess area 112a and the second recess area 112b, which is formed adjacent to the empty space in the body part 100a, moves to the outside of the case 100, a volume of the inner space of the case 100 increases in the moving process. Thus, when the internal pressure of the case 100 increases rapidly, the pressure may also temporarily decrease to prevent the case 100 from exploding.

Figure 5:
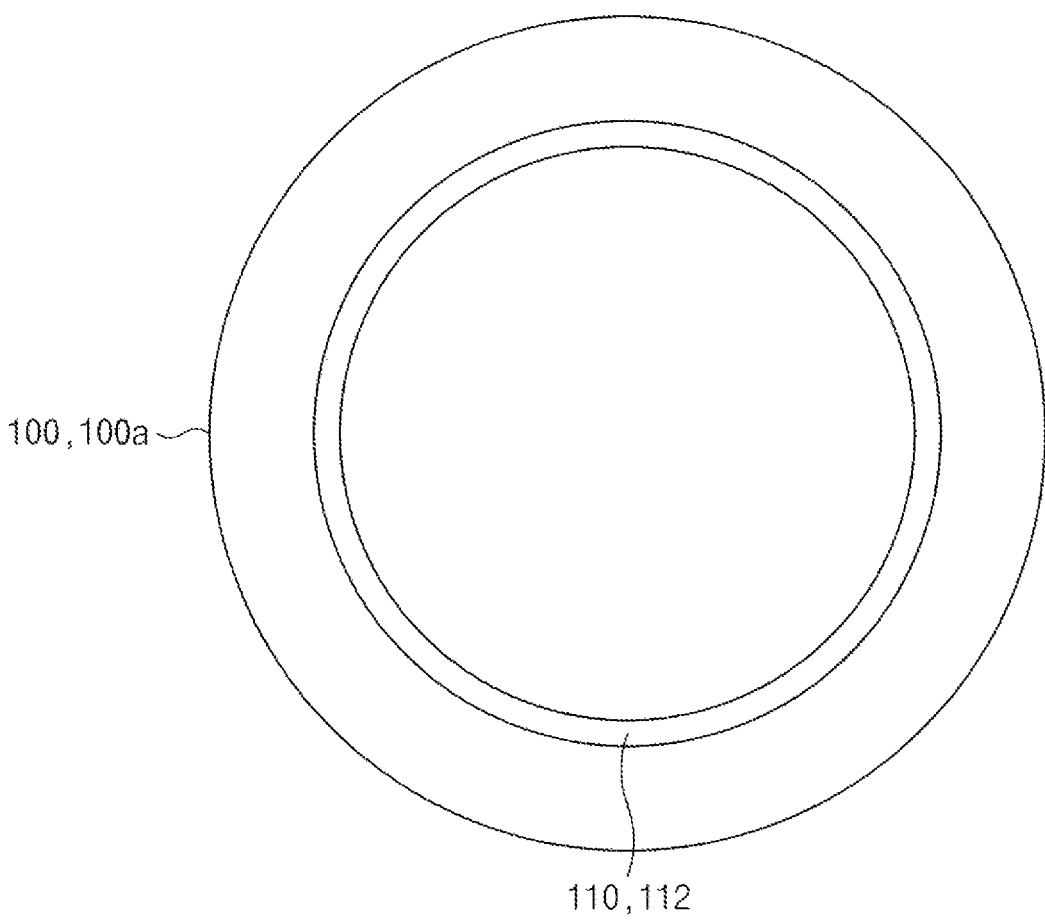
FIG. 5 is a plan view illustrating the gas discharge device in the case for a secondary battery when viewed in a vertical direction.

FIG. 5 is a plan view illustrating a state of a region in which the gas discharge device is formed in the case for secondary battery when viewed in a vertical direction.

As illustrated in FIG. 5, the gas discharge device 110 formed in the body part 100a of the case 100 according to the present invention may have a closed curve shape along a circumference of the bottom surface of the body part 100a. Particularly, in the gas discharging device 110, the recess part 112 may be formed to have a closed curve shape along the circumference of the bottom surface of the body part 100a. In this case, when the pressure of the empty space in the body part exceeds a predetermined value, the gas in the body part may be uniformly discharged at a high speed along the circumference of the bottom surface of the body part 100a. More preferably, the recess part 112 may be formed to have a circular shape along the circumference of the bottom surface of the body part 100a.

Figure 6:
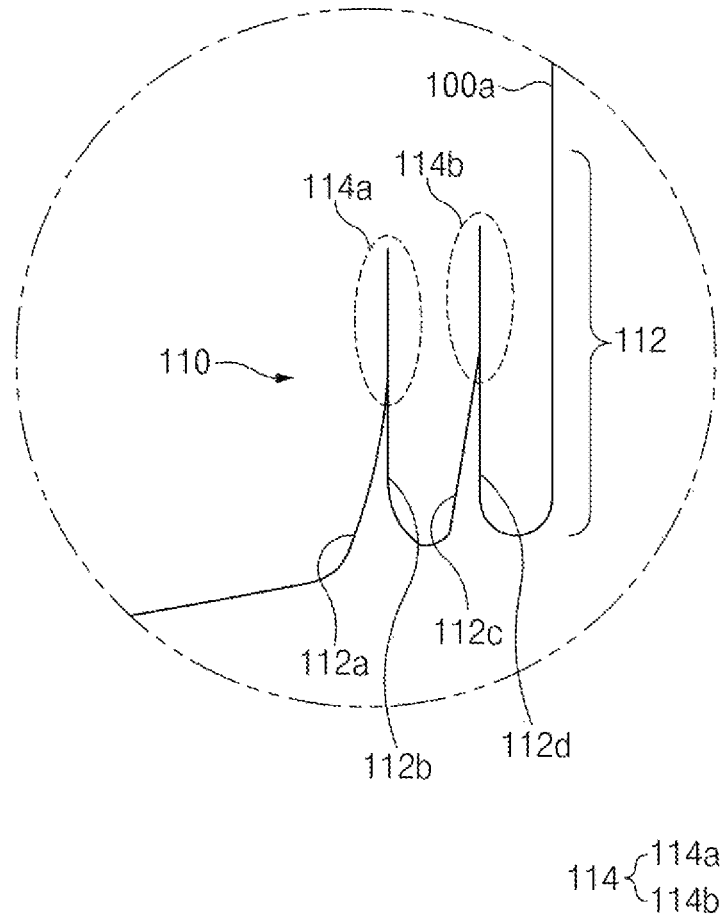
FIG. 6 is a vertical cross-sectional view illustrating a gas discharge device provided in a case for secondary battery according to another embodiment of the present invention.

FIG. 6 is a vertical cross-sectional view illustrating an ordinary structure of a gas discharge device provided in a case for secondary battery according to another embodiment of the present invention.

According to another embodiment of the present invention, a cutoff area formed in a recess part 112 of a gas discharge device 110 may be provided in plurality. For example, two cutoff areas may be formed as illustrated in FIG. 6.

More particularly, according to another embodiment of the present invention, the recess part 112 of the gas discharge device 110 may further include a third recess area 112c and a fourth recess area 112d in addition to a first recess area 112a and a second recess area 112b. In this case, the first recess area 112a and the second recess area 112b may face each other by using one of the two cutoff areas formed in the recess part 112 as a boundary, and the third recess area 112c and the fourth recess area 112d may face each other by using the other one of the two cutoff area as a boundary.

In this case, at least a portion of the first recess area 112a and at least a portion of the second recess area 112b may adhere to each other to form a first adhesion part 114a, and at least a portion of the third recess area 112c and at least a portion of the fourth recess area 112d may adhere to each other to form a second adhesion part 114b. Similar to the case according to one embodiment of the present invention, in the case according to another embodiment of the present invention, one end of both ends of the first recess area 112a, which is adjacent to an empty space in the body part 100a, and one end of both ends of the second recess area 112b, which is adjacent to the empty space in the body part, may adhere to each other to form the first adhesion part 114a, and one end of both ends of the third recess area 112c, which is adjacent to an empty space in the body part 100a, and one end of both ends of the fourth recess area 112d, which is adjacent to the empty space in the body part, may adhere to each other to form the second adhesion part 114b.
Secondary Battery A secondary battery according to the present invention may include an electrode assembly having a structure, in which electrodes and separators are alternately disposed, and a case for secondary battery, which accommodates the electrode assembly. Descriptions of the case for secondary battery is replaced with the descriptions of the above-described case 100.
Method for Manufacturing Case for Secondary Battery Hereinafter, a method of manufacturing a case for secondary battery according to the present invention will be described with reference to the foregoing contents with respect to FIGS. 1 to 6 and the case for secondary battery.

The method for manufacturing the case for secondary battery according to the present invention may include a preparation step of preparing a case 100 including a body part 100a having an empty space formed therein and a cutoff area formation step of cutting at least a portion of a surface of the body part 100a to form a cutoff area in the body part 100a. In the cutoff area formation step, the cutoff area may be formed on a bottom surface of the body part 100a, and the cutoff area may have a closed curve shape along a circumference of a bottom surface of the body part 100a. More preferably, the cutoff area may have a circular shape along the circumference of the bottom surface of the body part 100a.

Also, the method for manufacturing the case for secondary battery according to the present invention may further include a recession step of recessing a cutoff area formed in the cutoff area formation step toward the empty space in the body part 100a and an adhesion step of allowing at least some of areas recessed in the recession step to adhere to each other.

The recess part 112 described above may be formed by the recession step, and the adhesion part 114 described above, or the first adhesion part 114a and the second adhesion part 114b may be formed by the adhesion step.

According to the present invention, in the cutoff area formation step, two cutoff areas may be formed. That is, in the cutoff area formation step in the method for manufacturing the case for secondary battery according to the present invention, two areas of the surface of the body part 100a, which are spaced apart from each other, may be cut to form two cutoff areas in the body part 100a. When the two cutoff areas are formed by the cutoff area formation step, the adhesion parts 114a and 114b may be individually formed in the two cutoff areas after the adhesion step.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Case
100A: Body part
110: Gas discharge device
112: Recess part
112a: First recess area
112b: Second recess area
112c: Third recess area
112d: Fourth recess area
114: Adhesion part
114a: First adhesion part
114b: Second adhesion part
The invention claimed is:
1. A case for a secondary battery, comprising:
a body part including an empty space therewithin; and
a gas discharge device formed in the body part, the gas discharge device configured to form a passage through which a gas existing in the empty space is discharged to the outside when a pressure of the empty space exceeds a predetermined value,
wherein the gas discharge device comprises a recess part that is recessed toward the empty space, wherein the passage is formed through a cutoff area when the pressure of the empty space exceeds the predetermined value,
wherein the recess part includes a first adhesion part and the cutoff area defined by a first recess area and a second recess area, the first adhesion part including a first portion of the first recess area in adhesive contact with a second portion of the second recess area, the first and second portions being configured to separate from adhesion when the pressure of the empty space exceeds the predetermined value, the first recess area and the second recess area extending along the first adhesion part and the cutoff area on opposite sides thereof and defining a boundary of the first adhesion part and the cutoff area, the first recess area and the second recess area contacting each other at the first adhesion part and separated from each other at the cutoff area, wherein the recess part is formed in a bottom surface of the body part, the recess part is formed to have a closed curve shape along a circumference of the bottom surface.

2. The case of claim 1, wherein when the pressure of the empty space exceeds the predetermined value the adhesion of the first adhesion part is released to form the passage.

3. The case of claim 2, wherein the first adhesion part is spaced away from an inner surface of the body part.

4. The case of claim 1, wherein the case includes a plurality of cutoff areas.

5. The case of claim 4, wherein the recess part further comprises a third recess area and a fourth recess area, wherein the third recess area and the fourth recess area are separated by one of the plurality of cutoff areas of the recess part, the case further comprising a second adhesion part formed by adhering a portion of the third recess area to a portion of the fourth recess area.

6. A secondary battery comprising:

an electrode assembly with alternately disposed electrodes and separators; and the case for a secondary battery according to claim 1, wherein the electrode assembly is accommodated within the case.

\* \* \* \* \*